Patented Dec. 14, 1937

2,101,867

UNITED STATES PATENT OFFICE 2,101,867

MANUFACTURE OF WATER - SOLUBLE, STORAGE - STABLE ACETYLSALICYLIC ACID PRODUCTS

Clemmy O. Miller and Arthur E. Siehrs, Chicago, Ill.

No Drawing. Application August 18, 1934, Serial No. 740,387

25 Claims. (Cl. 167—65)

This invention relates to improvements in the treatment of acetylsalicylic acid or acetylsalicylic acid-providing or containing substances such, for example, as acetylsalicylic acid per se, and metal salts of acetylsalicylic acid such as calcium acetylsalicylate to produce water-soluble, storage-stable acetylsalicylic acid products.

Features of the invention include the production of decidedly more soluble acetylsalicylic acid preparations than in our knowledge have before been made, and the production of stable preparations of calcium acetylsalicylate. These preparations may be double salts or addition compounds.

In one specific embodiment, the invention consists in combining an acetylsalicylic acid-providing substance such as calcium acetylsalicylate and an amino acid to obtain an acetylsalicylic acid-providing substance containing a metal ion in a storage stable form. We prefer to use amino acids that may occur naturally in proteins, as glycine, glutamic acid, lysine, et cetera.

Another embodiment of the invention consists in combining acetylsalicylic acid per se with an amino acid to produce a water-soluble acetylsalicylic acid product.

A still further embodiment of our invention consists in combining acetylsalicylic acid per se with a salt of an amino acid to produce a water-soluble acetylsalicylic acid product, which is storage stable.

As used herein "amino acid" is intended to include a mixture of amino acids, since a mixture of two or more amino acids will act essentially the same as a single amino acid.

It is well known that acetylsalicylic acid has therapeutic value and that water-soluble preparations of it act more quickly than pure acetylsalicylic acid. A feature of our invention is the production of a water-soluble preparation of acetylsalicylic acid.

It is well known that calcium acetylsalicylate has definite pharmaceutical value. Heretofore, the objection to calcium acetylsalicylate has been its instability toward storage and ordinary handling. It decomposes to give salicylic acid and acetic acid, and/or other decomposition products, thus destroying its pharmaceutical value. The presence of moisture seems to facilitate the decomposition. Another feature of our invention is the production of a stable and water soluble preparation containing calcium and acetylsalicylic acid which is therapeutically equivalent to calcium acetylsalicylate, but does not have the undesirable property of decomposing on storage.

The method for producing a stable preparation of calcium acetylsalicylate according to our invention consists essentially in the preparation of a double salt, or of an addition compound, of the salt with an amino acid. By a double salt, or an addition product of an amino acid, we mean the type of compound having the properties of the compounds described by King and Palmer, in Biochem. J. 14: 574 (1920); Anslow and King, in Biochem. J. 21: 1168 (1927); Hugounenq and Florence, in Bull. Soc. Chim. 27: 750 (1920) and Bull. Soc. Chim. Biol. 3: 283 (1921). These articles describe the properties of double salts of amino acids with inorganic salts. However, we do not intend to limit ourselves to any particular type of structure or theory of formation. We prefer to use a biologically occurring amino acid, such as glycine, alanine, glutamic acid and lysine. Glycine and alanine belong to the class of monoamino-monocarboxylic acids, sometimes referred to as the neutral amino acids; glutamic acid belongs to the class of monoamino-dicarboxylic acids, sometimes referred to as acid amino acids, and lysine belongs to the class of diamino-monocarboxylic acids, sometimes referred to as basic amino acids. The stabilization of metal acetylsalicylates is a property of all amino acids, and our invention is not limited to the use of the biologically occurring amino acids.

The following are examples of how our invention may be used to prepare the stable product containing calcium and acetylsalicylic acid:

*Example I.*—199 parts of calcium acetylsalicylate are combined with 75 parts of glycine in the presence of 50 parts of water. The mixture is then stirred for one-half to two hours until the reaction, or addition, is complete. The double salt is then separated from the water by any convenient process, such as crystallization, precipitation by some organic liquid miscible with water as ethanol, by filtration, or by drying. The object of using water is to furnish a medium in which the reaction can take place. The amount of water can be varied without changing the essential features of the invention. We have found it desirable to use the least quantity of water possible. The object of stirring is to bring the reactants into intimate contact with each other. The time required for stirring varies with the efficiency of stirring. The reaction is ionic and hence rapid. Although the temperature at which mixing is carried out is not entirely essential to the practice of the invention, high temperatures favor hydrolysis of acetylsalicylic acid. Hence, we prefer to carry out the reaction at temperatures below 35° C. We have found it more convenient to use the reactants in stoichiometric proportions, but other proportions may be used. In this case, the product may be contaminated by one of the reactants unless the product is especially purified. In this example glycine is used as an example of a neutral amino acid.

*Example II.*—199 parts of calcium acetylsalicylate are combined with 147 parts of glutamic acid and 50 parts of water. Thereafter the procedure is essentially the same as in Example I.

In this example, as also in Example III, glutamic acid is used as an example of an acidic amino acid. When the proportions which we have specified are used, the double salt with the acid calcium glutamate is obtained.

*Example III.*—199 parts of calcium acetylsalicylate, 166 parts of calcium acid glutamate are mixed with 50 parts of water. Thereafter the procedure is the same as in Example I.

*Example IV.*—199 parts of calcium acetylsalicylate, 56 parts of calcium oxide, (or 100 parts of calcium carbonate, or 74 parts of calcium hydroxide) and 147 parts of glutamic acid are mixed in the presence of 50 parts of water. Thereafter the procedure is the same as in Example I. When these proportions are followed the double salt with the basic calcium glutamate is obtained.

*Example V.*—199 parts of calcium acetylsalicylate and 146 parts of lysine are mixed in the presence of 50 parts of water. The remainder of the process is the same as for Example I.

In this example, lysine is used as an example of a basic amino acid.

We intend to cover broadly the use of all the amino acids of which there are three classes: The neutral, the acidic and the basic. Glycine and alanine are examples of neutral amino acids. Glutamic acid is an example of the acidic amino acid, and lysine is an example of a basic amino acid. We do not limit our invention to the use of biologically occurring amino acids, since double salt formation or the production of addition compounds is characteristic of all amino acids.

Instead of using water as the reaction medium as specified in the above examples, a mixture of water and some organic liquid more or less miscible with water as for example water and methanol, or any ionizing solvent may be used. Such modifications do not alter the essential feature of our invention. We also claim the process for making intimate physical mixtures of calcium acetylsalicylate and an amino acid which render calcium acetylsalicylate more stable towards storage, and which on addition of water, gives the characteristic reaction of double salt formation. We do not limit the practice of our invention only to the preparation of double salts of calcium acetylsalicylate and amino acids, since the salts of all the alkali forming metals and trivalent metals react in a similar way. Bismuth and aluminum are examples of the trivalent metals. The use of these substances as acetylsalicylates in proportions chemically equivalent to the amounts specified for calcium acetylsalicylate in Examples I-V, and in the manner essentially as described, leads to the preparation of their corresponding double salts with the amino acids.

In regard to the soluble acetylsalicylic acid phase of our invention: It is well known that acetylsalicylic acid is not readily soluble in water. We have found that the incorporation of glycine, alanine, glutamic acid, lysine, or other amino acids which may naturally occur in proteins, with acetylsalicyclic acid, markedly increases the solubility of the acetylsalicylic acid in water. It seems most likely that this is due to the fact that the amino acid forms a salt with acetylsalicylic acid, although we do not wish to be limited in regard to any structure or theory of formation.

The following are examples of how the soluble acetylsalicylic acid products of this invention can be made:

*Example VI.*—180 parts of acetylsalicylic acid and 75 parts of glycine are combined with 50 parts of water and thoroughly mixed to permit chemical reaction. The water is removed by any convenient process. Increasing the proportion of glycine increases the solubility of acetylsalicylic acid. We prefer to carry out the reaction below a temperature of 35° C. Water is used as a reaction medium and hence can be varied without essentially changing the process. In this case, glycine is used as an example of a neutral amino acid.

*Example VII.*—180 parts of acetylsalicylic acid and 147 parts of glutamic acid are combined with 50 parts of water and thoroughly mixed. The remainder of the process is the same as for Example VI. Glutamic acid is used as an example of an acidic amino acid.

*Example VIII.*—180 parts of acetylsalicylic acid and 146 parts of lysine are mixed with 50 parts of water. The procedure thereafter is essentially the same as given in Example VI. Lysine is given as an example of the basic amino acids.

We claim as our invention, the use of all amino acids, since they act essentially the same as glycine, glutamic acid and lysine. Also, we claim as our invention the process of mixing glycine and acetylsalicylic acid, glutamic acid and acetylsalicylic acid, and any amino acid and acetylsalicylic acid, to form an intimate mixture, since, when brought into contact with water, the acetylsalicylic acid is rendered more soluble.

The following are examples of still another way by which we can increase the solubility of acetylsalicylic acid:

*Example IX.*—180 parts of acetylsalicylic acid and 166 parts of acid calcium glutamate $((C_5H_8O_4N)_2Ca)$ are mixed with a mixture of 50 parts of water and 50 parts of methanol until the chemical reaction is complete. The reaction product is separated from the alcohol-water solution by any convenient process, such as crystallization and filtration, or any other convenient process. We prefer to use the proportions of acetylsalicylic acid and acid calcium glutamate in which they react to form the double salt of the acid calcium glutamate and acetylsalicylic acid, although the proportions can be changed somewhat without changing essentially the nature of the product. The product may contain some of the excess of the substance used in excess. A mixture of methanol and water is used as the reaction medium and hence can be varied in quantity and in proportions of methanol and water, without changing essentially the nature of the product. Methanol is used to increase the solubility of acetylsalicylic acid. Other organic solvents that are miscible in water and which dissolve acetylsalicylic acid, as ethanol, may be used. The purpose of mixing is to bring the reactants into intimate contact with each other. We prefer to use temperatures below 35° C. to avoid hydrolysis of acetylsalicylic acid. The reaction can also be carried out by dissolving acetylsalicylic acid in methanol and mixing it with a solution of calcium glutamate in water, whereupon the double salt separates out.

*Example X.*—180 parts of acetylsalicylic acid and 186 parts of basic calcium glutamate ($C_5H_7O_4NCa$) are combined with a mixture of 50 parts of methanol and 50 parts of water and mixed until the reaction is complete. The procedure for carrying out the process and the conditions are essentially the same as given in Example IX.

*Example XI.*—180 parts of acetylsalicylic acid, 147 parts of glutamic acid, 56 parts of calcium oxide (or 74 parts of calcium hydroxide or 100 parts of calcium carbonate) are combined with a mixture of 50 parts of methanol and 50 parts of water and stirred until the reaction is complete. The procedure and the conditions under which our invention is carried out is essentially the same as described in Example IX.

*Example XII.*—180 parts of acetylsalicylic acid, 147 parts of glutamic acid, 28 parts of calcium oxide (or 37 parts of calcium hydroxide or 100 parts of calcium carbonate) are combined with a mixture of 50 parts of methanol and 50 parts of water and mixed until the reaction is complete. The procedure and conditions are essentially the same as described for Example IX.

In Examples XI and XII, an amount of glutamic acid hydrochloride chemically equivalent to the glutamic acid may be used instead of glutamic acid, providing there is a corresponding increase in the quantity of calcium oxide (or calcium hydroxide or calcium carbonate) used.

*Example XIII.*—180 parts of acetylsalicylic acid and 94 parts of the calcium salt of glycine are mixed with 50 parts of methanol. Thereafter the procedure is the same as in Example IX. In this case we prefer to use no water as a reaction medium.

*Example XIV.*—180 parts of acetylsalicylic acid and 165 parts of the calcium salt of lysine are mixed with 50 parts of methanol. Thereafter the procedure is the same as in Example IX. In this case, we prefer not to use water as a reaction medium.

We claim also the process of forming intimate mixtures of acetylsalicylic acid and the calcium salts of amino acids, which when brought into contact with water reacts to form the addition products whose preparations are described in Examples IX–XIV and which increases the solubility of acetylsalicylic acid in water. We have illustrated the use of our invention giving the calcium salts of glutamic acid as an example of the use of a salt of a neutral amino acid and the calcium salt of lysine as an example of the use of the salts of a basic amino acid either per se or we claim the use of the calcium salts of all amino acids since they react essentially in the same way.

Also, we claim the process for making a preparation for increasing the solubility of acetylsalicylic acid in which the alkali forming metal and trivalent metal salts of amino acids are used, as, for example, the use of acid magnesium glutamate, basic magnesium glutamate, sodium glutamate, etc. The various proportions of these substances necessary to use in the practice of our invention are chemically equivalent to the proportions we have specified for the calcium salts, and can be readily ascertained by those familiar with the art.

Inasmuch as it appears to us that the production of a soluble and stable acetylsalicylic acid preparation by combining it with amino acids is closely related to the production of stable calcium acetylsalicylates by the use of these same amino acids, we have claimed broadly the use of all amino acids in relation to acetylsalicylic acid-providing or containing compounds such as acetylsalicylic acid or calcium or other salt of acetylsalicylic acid, for either making the acetylsalicylic acid compound more soluble or for making it more stable. We claim also the use of mixtures of amino acids for increasing the solubility and/or stability of acetylsalicylic acid, as, for example, the preparation of a double salt using calcium acetylsalicylate with a mixture of glycine and glutamic acid.

We have described methods whereby stable preparations containing acetylsalicylic acid or an acetylsalicylic acid residue, calcium glutamate or glutamic acid residue may be obtained. The corresponding preparations containing sodium, magnesium, potassium, strontium, and aluminum can be made by substituting in each case a compound containing sodium, magnesium, potassium, strontium, or aluminum in proportions chemically equivalent to the calcium compound that is used in the illustrative procedure. For example, 180 parts of acetylsalicylic acid and 169 parts of sodium acid glutamate are mixed with 50 parts of water until the reaction is complete. The water is separated from the reactive product by some convenient process, such as drying, precipitation by an organic solvent miscible with water, etc. We prefer to use the reacting substances in the proportions in which they react chemically and to carry out the reaction below 35° C. As an example of the use of magnesium, we give the following, 180 parts of acetylsalicylic acid and 158 parts of magnesium glutamate are mixed with 50 parts of water. The remainder of the process is essentially the same as described above for acetylsalicylic acid and sodium glutamate.

In these examples, sodium and potassium are given as examples of monovalent metal ions, calcium, magnesium, and strontium as bivalent metal ions, and aluminum as a trivalent ion.

We claim as our invention:

1. As a composition of matter, a mixture of a member of the group consisting of acetylsalicylic acid and its metal salts and a member of the group consisting of amino acids and their metal salts.

2. The process which comprises combining a member of the group consisting of acetylsalicylic acid and its metal salts and a member of the group consisting of amino acids and their metal salts in the presence of an ionizing solvent and recovering the product.

3. As a composition of matter, the product obtained by combining a member of the group consisting of acetylsalicylic acid and its metal salts and a member of the group consisting of amino acids and their metal salts in the presence of an ionizing solvent, and recovering the product.

4. As a composition of matter, a mixture of acetylsalicylic acid and an amino acid.

5. As a composition of matter, a mixture of acetylsalicylic acid and glycine.

6. The process which comprises combining acetylsalicylic acid and an amino acid in the presence of an ionizing solvent and recovering the product.

7. The process which comprises combining acetylsalicylic acid and glycine in the presence of an ionizing solvent and recovering the product.

8. As a composition of matter, the product obtained by combining acetylsalicylic acid with an amino acid in the presence of an ionizing solvent, and recovering the product.

9. As a composition of matter, the product obtained by combining acetylsalicylic acid with glycine in the presence of an ionizing solvent, and recovering the product.

10. As a composition of matter, a mixture of acetylsalicylic acid and a metal salt of an amino acid.

11. As a composition of matter, a mixture of acetylsalicylic acid and a metal salt of an amino acid selected from the group consisting of the alkali metal and alkaline earth metal salts of glutamic acid.

12. As a composition of matter, a mixture of acetylsalicylic acid and a calcium glutamate.

13. The process which comprises combining acetylsalicylic acid and a metal salt of an amino acid in the presence of an ionizing solvent, and recovering the product.

14. A process which comprises combining acetylsalicylic acid and a metal salt of an amino acid selected from the group consisting of the alkali metal and alkaline earth metal salts of glutamic acid in the presence of an ionizing solvent and recovering the product.

15. The process which comprises combining acetylsalicylic acid and a calcium glutamate in the presence of an ionizing solvent and recovering the product.

16. As a composition of matter, the product obtained by combining acetylsalicylic acid with a metal salt of an amino acid in the presence of an ionizing solvent, and recovering the product.

17. As a composition of matter, the product obtained by combining acetylsalicylic acid with a metal salt of an amino acid selected from the group of alkali metal and alkaline earth metal salts of glutamic acid in the presence of an ionizing solvent, and recovering the product.

18. As a composition of matter, the product obtained by combining acetylsalicylic acid with a calcium glutamate, in the presence of an ionizing solvent, and recovering the product.

19. As a composition of matter, a mixture of a metal salt of acetylsalicylic acid and an amino acid.

20. As a composition of matter, a mixture of calcium acetylsalicylate and glutamic acid.

21. The process which comprises combining a metal salt of acetylsalicylic acid and an amino acid in the presence of an ionizing solvent and recovering the product.

22. The process which comprises combining calcium acetylsalicylate and glutamic acid in the presence of an ionizing solvent and recovering the product.

23. As a composition of matter, the product obtained by combining a metal salt of acetylsalicylic acid and an amino acid in the presence of an ionizing solvent, and recovering the product.

24. As a composition of matter, the product obtained by combining calcium acetylsalicylate and glutamic acid in the presence of an ionizing solvent, and recovering the product.

25. A composition of matter suitable for therapeutic purposes, comprising a dry, stable mixture of acetyl salicylic acid and a sufficient proportion of a biologically occurring amino acid to impart a substantial solubilizing effect on the acetylsalicylic acid in water.

CLEMMY O. MILLER.
ARTHUR E. SIEHRS.